(12) United States Patent  
Obernuefemann

(10) Patent No.: US 8,782,359 B2  
(45) Date of Patent: Jul. 15, 2014

(54) DATA RECOVERY SYSTEMS AND METHODS

(75) Inventor: Paul R. Obernuefemann, O'Fallon, IL (US)

(73) Assignee: Lewis, Rice & Fingersh, L.C., St. Louis, MO (US)

( * ) Notice: Subject to any disclaimer, the term of this patent is extended or adjusted under 35 U.S.C. 154(b) by 0 days.

(21) Appl. No.: 13/564,574

(22) Filed: Aug. 1, 2012

(65) Prior Publication Data

US 2012/0296874 A1     Nov. 22, 2012

Related U.S. Application Data

(63) Continuation of application No. 13/008,721, filed on Jan. 18, 2011, now Pat. No. 8,327,098, which is a continuation of application No. 12/031,404, filed on Feb. 14, 2008, now Pat. No. 7,873,805.

(60) Provisional application No. 60/891,461, filed on Feb. 23, 2007.

(51) Int. Cl.  
*G06F 12/16* (2006.01)  
*G06F 11/14* (2006.01)

(52) U.S. Cl.  
CPC ........ *G06F 11/1461* (2013.01); *G06F 11/1469* (2013.01); *G06F 11/1456* (2013.01)  
USPC ........................................... 711/161; 711/162

(58) Field of Classification Search  
CPC ........ G06F 3/067; G06F 3/065; G06F 3/0683  
USPC .................................................. 711/161, 162  
See application file for complete search history.

(56) References Cited

U.S. PATENT DOCUMENTS

| | | | |
|---|---|---|---|
| 2001/0047412 | A1 | 11/2001 | Weinman, Jr. |
| 2004/0024808 | A1 | 2/2004 | Taguchi et al. |
| 2006/0271815 | A1 | 11/2006 | Mizuno et al. |
| 2007/0026276 | A1 | 2/2007 | Ogawa et al. |
| 2008/0016387 | A1* | 1/2008 | Bensinger .................... 714/4 |
| 2008/0072002 | A1 | 3/2008 | Kuwahara et al. |

* cited by examiner

*Primary Examiner* — Than Nguyen  
(74) *Attorney, Agent, or Firm* — Lewis, Rice & Fingersh, L.C.

(57) ABSTRACT

Nearline disaster recovery ("nearline DR") storage systems and methods that permit the use of previously restored stored data from a near time period by virtual applications operating off a backup storage location during the period of disaster recovery at a primary site. This is generally referred to as a "nearline DR storage process."

4 Claims, 1 Drawing Sheet

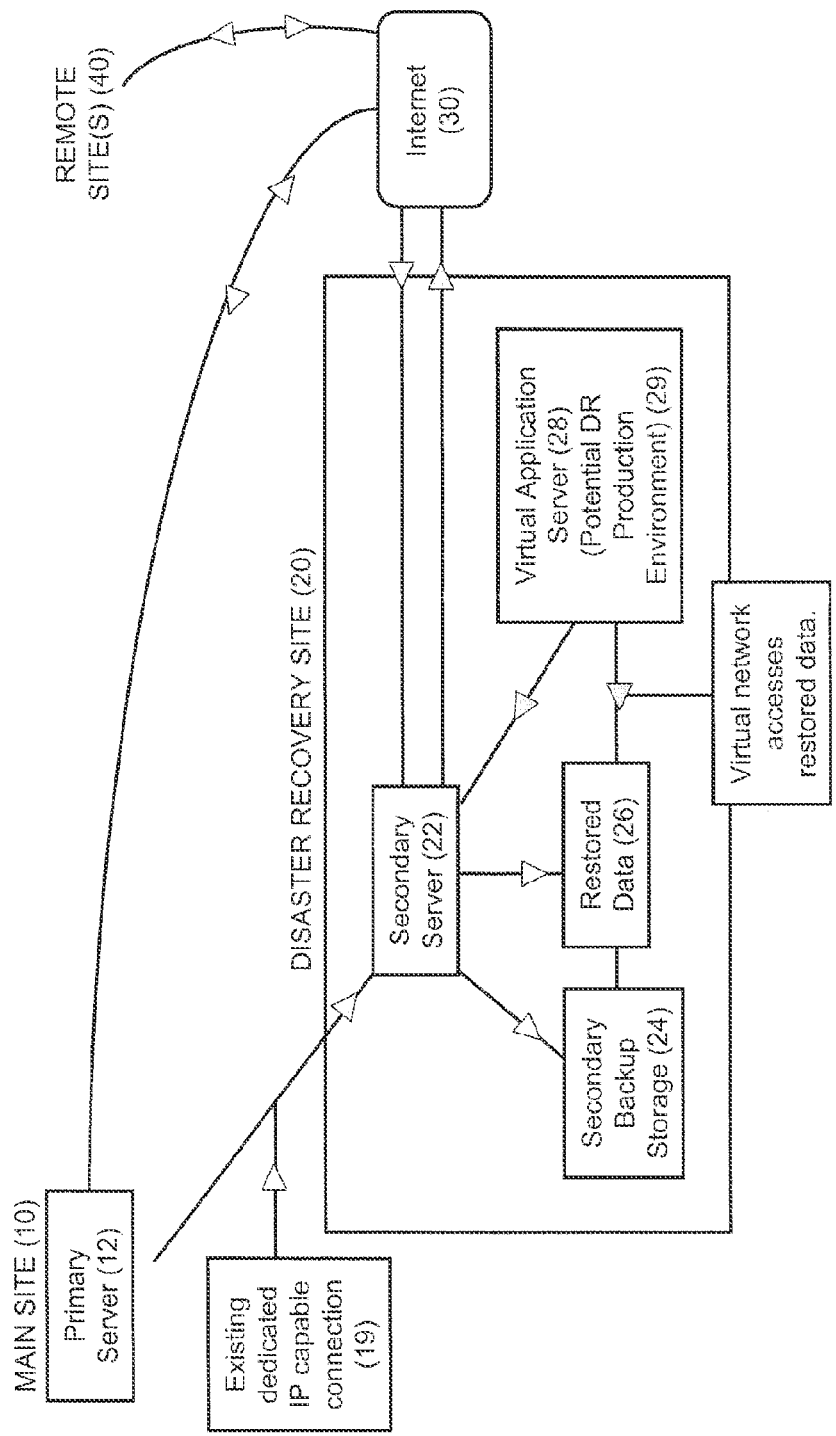

DATA RECOVERY SYSTEMS AND METHODS

CROSS REFERENCE TO RELATED APPLICATION(S)

This application is a Continuation of U.S. Utility application Ser. No.: 13/008,721 filed Jan. 18, 2011 and now U.S. Pat. No. 8,327,098, which is a Continuation of U.S. Utility application Ser. No.: 12/031,404 filed Feb. 14, 2008 and now U.S. Pat. No. 7,873,805, which in turn claims benefit of U.S. Provisional Patent Application 60/891,461 filed Feb. 23, 2007. The entire disclosure of these documents is herein incorporated by reference.

BACKGROUND

1. Field of the Invention

This disclosure relates to the field of digital data recovery in the event of a catastrophic event. Specifically, it relates to the field of nearline data storage systems and methods that permit limited use of data and systems by virtual applications while the system is being repaired.

2. Description of the Related Art

Individuals and corporations have long found it necessary to create backup copies of essential data and provide a means for returning the backup data to usable form. From carbon copies of handwritten documents stored in fireproof safes to digital replicas of massive quantities of data stored on offsite servers, the need for insurance that data will be available after a catastrophe has inspired numerous technological advances and an entire industry. In this digital age, with its incredible amount of generated data and reliance on digital storage, secure data storage and disaster recovery will only become more crucial.

Data storage technologies are often measured by three criteria: accuracy, speed, and cost. Backup data should be as accurate as possible: that is, disparity between the backup data and the data at the time of the disaster must be minimal. Given that a data loss cripples a company, and that time is money, data recovery should also be efficient and expeditious. Finally, solutions may present several different cost levels for businesses of different financial situations and priorities. Current solutions run from online "hot sites," which continuously synchronize data and can restore that data almost immediately upon request, to offline "cold sites," which are little more than a piecemeal space in which to coddle together data backups using shared equipment.

These present forms of digital data storage fall short of presenting an ideal balance of accuracy, speed, and cost, due to several problems. Firstly, replication hot sites, which provide the most accuracy and speed, are extraordinarily expensive. Hot sites constantly create backups, and store them in instantly usable formats that use a great deal of storage space. The effort and space involved in hot sites render them simply impractical for smaller businesses.

Second, more affordable restoration techniques used in cold sites are often too slow to restore business continuity after a disaster. Transforming compressed data stored on physical storage media, such as tapes or CDs, may require too much time. Even after transformation, the data must then be linked to the company's applications and users. This is usually accomplished by sending the data back to the business' main site. Cold sites require time to load data onto shared equipment, which may even need to be powered up or extricated from other jobs. These tasks are often only begun after a disaster occurs, further delaying a return to business continuity. During cold site data restoration, the data is not usable and business continuity is interrupted for an extended periods while the restoration is performed.

It is therefore desirable to achieve online hot sites' accuracy, instantaneous data availability, and minimal recovery time during a recovery, but with the lower cost of offline, cold sites. It is also desirable to have usable backup data available while in a recovery to allow ongoing business and meeting of critical deadlines. Such a compromise may be referred to herein as "nearline."

In addition, many backup and restoration systems rely on components that are just as prone to being destroyed in a catastrophe as the data they are meant to protect. For example, many storage media require physical restoration devices which, with an eye toward speedy recovery, may be kept on site. In addition, many disaster recovery systems rely on the same programs and servers used to access and process working data to access and process the backup data. With such a setup, the physical restoration devices and the native applications are just as vulnerable to a catastrophe and are not backed up, as they are the backup system. It is all too conceivable that a disaster would destroy both the primary data and the means for restoring backup data by destroying that server, leaving users with only a copy of the backup data and no means by which to restore or use it. Restoring native applications and finding replacement restoration devices in the event of such a catastrophe lengthens the period of business continuity interruption, increases cost, and takes man-hours away from other recovery tasks. It is therefore desirable to have a data recovery system that does not rely on proprietary platforms stored onsite to restore data.

Finally, current storage solutions are excessively segmented in their offerings. Businesses must choose between preset "hot site" or "cold site" options that may not precisely fit their needs (i.e., what sorts of data or applications are available first; what human resources are necessary to restore business continuity; and the length of time necessary to restore business continuity) or budgets. It is therefore desirable to have a data recovery system that is customizable to fit business business needs and budgets, and which can be scaled in terms of immediacy of data accessibility and accuracy of backup data depending on an interplay of cost of backup operations compared to speed of recovery in the event of a disaster. This may be achieved by customizing how "live" data is and how often data is backed up.

SUMMARY

Because of these and other problems in the art, described herein, among other things, are nearline disaster recovery ("nearline DR") storage processes, systems, methods, and architecture that permits the use of previously restored stored data from a near time period by virtual applications operating off a backup storage location during the period of disaster recovery at a primary site.

Described herein, among other things, is a nearline disaster recovery storage system, the system comprising: a first site having a primary server for supporting an operating system and at least one application to run on at least one client; a data set generated at the first site, manipulated by the first site, and stored on the primary server; a backup data set duplicative of the data set, generated and stored at the first site; a backup site geographically separated from the first site, the backup site comprising a connection to the first site via which the backup data set can be transported from the first site to the backup site after generation of the backup data set, a storage facility for the backup data, and a secondary server; and a virtual application server, the virtual application server comprising the operating system, the at least one application, and a means for allowing remote access to the virtual application server; wherein upon receipt of the backup data set, and prior to a disaster event, the backup data set is restored onto the secondary server in native format so that a server at the backup site can manipulate the backup data set as the primary server manipulates the data set; and wherein after the backup data set is restored and in the event the primary server becomes unusable, the virtual application server can attach to the backup data set.

In an embodiment of the system, the backup data set can be generated on command. In an alternative or further embodiment, the backup data set can be generated repeatedly upon a lapse of a set time period.

In an embodiment, the backup data set is transported by the restoration server. In a further or alternative embodiment, the backup data set is transported using the software used to generate the backup data set. The transport of the backup data set may be incremental. In an embodiment, the backup data set is restored by the software used to generate and transport the backup set.

The virtual application server may host programs for email, document use, and business accounting. In an embodiment, the virtual application server may be used while the first site and the data set are brought back online. The virtual application server may be used remotely and/or at the backup site.

Also disclosed herein is a method for nearline disaster recovery, the method comprising: generating a data set at a first site, the first site comprising a primary server for allowing an operating system and at least one application to run on at least one client; storing the data set on the primary server; generating a backup data set duplicative of the data set; storing the backup data set at the first site; transporting a copy of the backup data set to a backup site geographically separated from the first site, the backup site comprising a connection to the first site, a secondary server, and a storage facility for the backup data set; restoring the copy of the backup data set to native format onto the secondary server, so that a server at the secondary site can manipulate the data set as the primary server manipulates the data set, the restoring occurring prior to a disaster event; in the event of the primary server becoming unusable, attaching a virtual application server to the restored backup data set, the virtual application server including the operating system and at least one application; and accessing remotely the virtual application server.

In an embodiment of the method, the step of generating a backup data set may be performed on command. In a further or alternative embodiment, the step of generating a backup data set may be performed repeatedly upon a lapse of a set time period.

In an embodiment, the step of transporting is performed between the primary and the secondary server. In a further or alternative embodiment, the step of transporting is performed by software used in the step of generating the backup set. The step of transporting the backup data set may be incremental. In an embodiment, the step of restoring is performed by software used in the step of generating the backup data set and the step of transporting.

In an embodiment of the method, the virtual application server hosts programs for email, document use, and business accounting. The method may further comprise using the restored data set while simultaneously bringing the first site and the data set back online. Further or alternatively, the method may comprise using the virtual application server remotely and/or at the backup site.

The method may further comprise: generating a second backup data set duplicative of the backup data set; storing the second backup data set at the backup site; transporting a copy of the second backup data set to a third site geographically separated from the first site and the backup site, the third site comprising a connection to the backup site and the first site, a tertiary server, and a storage facility for the second backup data set; restoring the copy of the second backup data set to native format onto the tertiary server, so that a server at the tertiary site can manipulate the second backup data set as the secondary server manipulates the backup data set, the restoring occurring prior to a disaster event; in the event of the primary server and the secondary server becoming unusable, attaching a virtual application server to the restored backup data set, the virtual application server including the operating system and at least one application; and accessing remotely the virtual application server.

BRIEF DESCRIPTION OF THE DRAWINGS

FIG. 1 is a flowchart showing an embodiment of a data recovery system.

DESCRIPTION OF PREFERRED EMBODIMENTS

The nearline DR storage process, system, or method disclosed herein begins with the creation of operations data at a first, main site (10) and the creation of a backup data set from that first data set. In an embodiment, the backup data set is stored in a primary server (12) at the main site (10). As used herein, "backup" may refer to any means for creating a secondary data set, including replication, snapshot means, replay means, or any other means known in the art. This backup can be performed at any frequency, as dictated by the business' needs and constraints. This scalability offers an improvement over hot sites, which price many businesses out due to their expense and overhead, constant backups. In an embodiment, such a periodic backup can be performed at the end of a workday, work week, or other period during which modification of the data may be required.

After a primary backup is completed, the primary backup data set is transported, or migrated, to a backup or disaster recovery site (20) and put into storage (24). In an embodiment, the migration is accomplished using one or more offsite secondary server(s) (22) and an existing dedicated Internet Protocol ("IP") capable connection (14) to the primary server (12). In an embodiment, this migration is performed by the same backup software (licensed or purchased for use at the backup site) that was used to create the backup set, thus decreasing the investment necessary to achieve this DR system and again improving on expensive hot sites and technologically cumbersome cold sites. In an embodiment, the migrated data is incremental: that is, it reflects only the changes made since the last primary backup. This, too, adds desired flexibility.

After migration, there are two replicated data storage locations: primary (12) and secondary (24). In an embodiment, this secondary backup storage (24) is at a site (20) geographically remote or separated from the main site (10). This accomplishes the goal of isolating backup data from primary data so that backup data is generally not destroyed in any catastrophe (such as a fire or server crash, for example) that is generally geographically limited to the primary site.

The extent to which the backup site is geographically limited from the primary site is scalable according to business needs and constraints: the backup site may be on a different floor from the primary site, in a different building, in a different city, or even in a different country or in a protected site such as a below-ground bunker. The extent of geographic limitation may be informed by cost and degree of geographic protection, as well as some downsides to geographic limitation (such as the relative inability of primary site personnel to simply stop in the backup site such as to check on its operation or availability of IP connectivity).

After completion of the migration to secondary data storage (24), a restore begins, using storage space on the secondary or restoration server (22). The restore step creates a usable data set (26) in "native" format; i.e., in formats that production software can use. This is an improvement over cold sites, which provide native format data only after arduous steps are taken in the panicked period after a disaster. Moreover, the restored data (26) is accurate, less any changes to data since the last data migration between the primary (12) and secondary locations (24). In an embodiment, the restore is performed by the same backup software that performed the primary backup and the migration, but in a different mode. This accomplishes the goal of lowering the cost of data recovery systems by minimizing the necessary software.

This restore upon completion of the migration accomplishes the goal of approximating "hot site" storage accuracy in that the data is only one backup period old, the period being personalized to the business' needs and constraints. The restore is performed as a matter of course, rather than only when triggered by a disaster, so that a usable form of backup data always exists. In the event of any disaster or catastrophe, the remote, restored backup data set is immediately available, in contrast to systems where the backup set must be restored on command after a disaster has already occurred. This accomplishes the goal of approximating hot sites' provision of online data. In addition, the degree of accuracy is scalable by altering backup frequency in response to business needs and constraints: businesses with greater needs for accuracy and greater budgets can back up every hour or day, whereas businesses with smaller needs for accuracy or smaller budgets can back up less often.

With this restored, replicated data (26), business continuity is possible in the event of a disaster, even one that completely destroys the main site (10). In such an event, a DR production environment (29) would be activated in an embodiment. In an embodiment, the DR production environment (29) uses VMWare™, Novell™, Microsoft™, or any other equivalent virtualization or native network server operating system ("NOS") known in the art to host replicated systems for production programs such as email, document use, and business accounting. In the event of a catastrophe, this DR production environment (29) would be loaded onto one or more virtual application server(s) (28), an arrangement in which multiple operating systems are hosted by a single piece of hardware (or any other combination known in the art). The advantage of a virtual server is its minimal nature, and that it can function during the disaster recovery period. These virtual application servers (28) need not be attached to the secondary server (22). Embodiments may invest different amounts in these servers and applications.

The DR production environment (29) would attach to the last previously restored production data (26) residing on the secondary disk (22) and make the data "live" and available for use. This would literally create a copy of the production network architecture, in total or any parts thereof deemed necessary for business continuity during disaster recovery. That is, the DR production environment (29) creates a replicated "live" production environment on the hardware device at the DR site (20). Clients, either those normally used in the course of business, new clients obtained for this purpose, or any other clients may then be attached to the virtual site that survived the disaster. This replicated live environment permits use of the systems until another production system (i.e., the primary data systems that hold the actual "live" data produced and used every day) can be rebuilt, brought online, or moved to another location.

In comparison to cold sites, which after a disaster must completely decompress and reformat all data after the disaster, the embodiments disclosed herein accomplish the goal of speedy recovery, in that all that is necessary is the loading of the virtual production environment and attachment to the secondary data, which has already been at least partially or wholly restored prior to the disaster. This is in sharp contrast to cold sites, in which physical devices must transcribe the data into usable form; in the embodiment disclosed herein, the restored daily data (26) is already in usable form and must only be attached to the production environment (29).

Moreover, once attached to the production environment (29), the data (26) can be used while the main site (10) and primary data (26) are brought back online. This accomplishes the goal of speedy restoration to business continuity even without restoration of the main site (10). Users can access the live secondary replicated data remotely (30) (as through the internet, virtual private network (VPN), or any other means) or directly at the DR site (20). In an embodiment, internet access to, and manipulation of, the live data would be through the programs supported by the network operating system combination (29). The NOS (29) can be leveraged to allow access from any remote site (40) to the DR site (20); in an embodiment, this can be accomplished via any type of data link accessing an internet service provider location.

In an embodiment, the backup data set can also be replicated after a disaster, using the second site as a primary site and a third site as a new second site to which backup data is migrated. This transitivity among sites allows for continued data security even while the backup data set is being used and modified in the recovery period after a disaster. The third site may be just as scalable as the original second site in its distance, applications, period between backups, and other factors. In this embodiment, a series of disasters (such as an extensive flood as in a hurricane, power outage, or fire) is less likely to destroy all data sets.

The DR production environment's (29) use of existing virtualization or native NOS hardware and software creates the possibility of several different embodiments with different applications that are remotely accessible. Any application with a web or other remote access component can attach to the newly live data (26). This diversity accomplishes the goal of creating a fully scalable and customizable disaster recovery scheme, in that businesses may select which applications they wish to attach to the restored data (26). In addition, the use of remotely accessible applications is an improvement over the current DR schemes in that users need not have the actual application on whatever machine they use to access the data; business continuity can be achieved without any use of company hardware or software residing at the main site (10). This accomplishes the goals of isolating disaster recovery applications from the main site (10) and the use of hardware and software the business already owns. The restored daily data (26) may be used, and business continuity restored, through the usual native web or other remote applications, even if the main site (10) and all servers therein are destroyed.

Another embodiment could use a dedicated Internet connection as the link into the secondary data (26) via VPN, or access to the application layer servers (28). In yet another embodiment, the DR system could be accessed on-site (20)

for connectivity and administration. This could be accomplished by a secondary IP data switch connecting the necessary hardware. As with the embodiment using general internet access, neither of these embodiments rely on components at the main site (10), permitting the restoration of business continuity even after a catastrophe at the main site (10).

The equipment used in the migration, restoration, and remote production at the disaster recovery site (20) may be mobile and require nothing from the outside except a broadband or internet connection. This isolation from the main site (10) ensures that a disaster at the main site (10) will not impede recovery and use of the restored daily data (26).

This nearline DR process is not meant to be a replacement hot site but, rather, a migration of the daily backup data and a transformation or restoration of that data into live data. It functions more as a bridge during relocation and rebuilding of the required infrastructure to a pre-Disaster Recovery state. By virtue of the DR production environment (29), the web-based applications it hosts, and the "live" data it incorporates, users at the main site (10), remote site(s) (40), or the DR site (20) have a near-accurate set of data (26) they can use while disaster recovery is still ongoing. Moreover, the system is completely isolated from the main site (10), so that disaster recovery occurs just as simply after a small data loss as after a large scale catastrophe. Finally, nearly every component of the DR architecture is scaleable, and can be adjusted to any system architecture, software environment, and budget. Components that are particularly advantageous if scalable are the frequency of backup and the virtual applications available; however, any component may be scaled. The nearline DR storage process can be designed according to the needs of an individual business, in contrast to current regimented solutions.

In an embodiment, a business would use the nearline DR storage process in the following way. The main server, which stores all the data the clients create in the ordinary course of business, would back up that generated data, into a compressed format, every evening after the close of business. That backup data set would be transmitted to another business server at a different, secondary site. Transmittal could be accomplished via an IP capable connection, for example, or by physically moving data tapes or CDs. Upon arrival, that backup data set would be loaded onto the secondary server, and backup software would restore that backup data set to a usable native format.

At some point, unfortunately, the business suffers a disaster which destroys the primary server and the clients typically used to access and store that server's data. Business personnel would then go to the secondary site and activate a virtual application server, which hosts the business' essential applications (such as, but not limited to, word processing, accounting, e-mail, document management, and web browsing). The virtual server would link to the data, as already restored (or at least already in the process of being restored) as a matter of course, for processing by the applications. For maximum mobility, these applications would also have remote access capabilities. Business personnel would be issued substitute clients (or may already have them), which would be connected to the secondary server via any IP connection, such as from the personnel's home Internet connection and equipment.

Personnel could then continue performing normal business via remote access applications and the data set from the day before the disaster, with minimal interruption of business continuity. The secondary server would then serve in place of the main server, storing and backing up the data generated by the substitute clients. Upon restoration of the main site, that data would be transferred to the new main server, (possibly by simply reversing the roles of the primary and secondary systems during off hours, such as overnight, and the switching over of the connection before users recommence connections in the next use cycle), workplace clients reissued, and the DR storage process returned to original status.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for restoring business continuity in the event of a disaster that destroys data, the method comprising:
   restoring a data set to native format prior to destroying of data at a first data site, the destroyed data being included in the restored data set;
   activating a data recovery production environment;
   loading said data recovery production environment onto one or more virtual application servers;
   attaching said restored data set to said data recovery production environment;
   making said restored data set live and available for use over said one or more virtual application servers and thereby restoring business continuity.

2. The method of claim 1, wherein said data recovery production environment can use a network server operating system chosen from the group consisting of: VMWare, Novell and Microsoft Windows.

3. The method of claim 1, wherein said one or more virtual application servers can be used remotely.

4. A disaster recovery system, the system comprising:
   a server;
   a data storage facility co-located with said server;
   a virtual application server co-located with said server and co-located with said data storage facility, said virtual application server comprising an operating system and a means for allowing remote access to said virtual application server; and
   a network connecting said disaster recovery system to a plurality of remote sites, said network allowing for the transfer and receipt of data;
   wherein said disaster recovery system receives a backup data set over said network from a remote site in said plurality of remote sites;
   wherein said server restores said backup data set to a native format prior to destroying of data at said remote site in said plurality of remote sites, the destroyed data being included in said backup data set;
   wherein after said backup data set is restored said virtual application server can attach to said backup data set.

* * * * *